United States Patent Office.

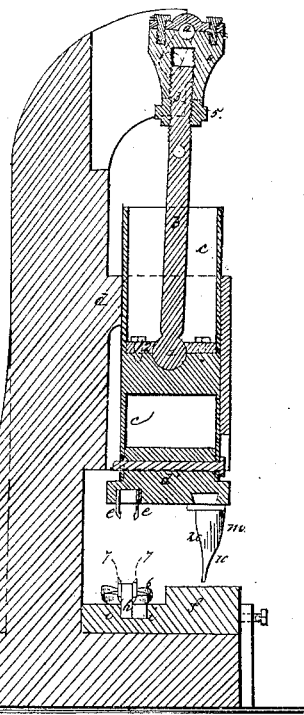

HEMAN WHIPPLE AND ELON DENIO, OF BALDWINSVILLE, NEW YORK.

Letters Patent No. 81,965, dated September 8, 1868.

IMPROVEMENT IN MAKING FORKS.

The Schedule referred to in these Letters Patent and making part of the same.

TO ALL WHOM IT MAY CONCERN:

Be it known that we, HEMAN WHIPPLE and ELON DENIO, of Baldwinsville, in the county of Onondaga, and State of New York, have invented, made, and applied to use a certain new and useful Improvement in Splitting and Bending Metal for Forks, Hooks, Rakes, &c.; and we do hereby declare the following to be a full, clear, and exact description of the said invention, reference being had to the annexed drawing, making part of this specification, wherein—

Figure 1 is a vertical section of the machine employed by us.

Figure 2 is a sectional plan of the machine at the line $x\ x$, and

Figure 3 is an inverted plan of the cutting and bending-tools upon the moving plunger.

Figure 4 is a section of the bed-block, in larger size, at the line $y\ y$, fig. 2.

Similar marks of reference denote the same parts.

This invention is to cut an incision in a sheet or bar of metal, to form therefrom the tine or prong of a fork, hook, or rake, said incision being made without bending down one part much below the other, as usual in shears.

And we also employ a peculiar plunger and swinging support, by means of which the prong or tine is bent around into the proper position for forging or drawing down to shape, to produce the given article.

In the drawing, $a$ is a revolving crank-shaft, with a connecting-rod, $b$, to the plunger $c$, that slides in the head-block $d$, and carries the moving tools for operating upon the metal.

The plunger $c$ is hollow, so that the rod $b$ passes down into it, and, by a ball, 1, and plate 2, the plunger and rod are permanently connected; but the rod $b$ can be revolved to turn its screw 3 in the end piece 4, and thereby adjust the position vertically of the cutting and bending-tools that are attached to the lower end of the plunger $c$. 5 is a set or jam-nut upon the screw 3.

The tool-stock $d'$ is attached to the lower end of the plunger $c$ by a bolt or key, so as to be removable, and carries the tools hereafter named.

The slitting of the bar or plate of metal is effected by the cutters $e\ e$, attached to the stock $d'$, and $h$ is a bed-shear attached to the bed-block $f$. Said shear is of a width to allow the cutters $e$ to come down, one upon each side of it; but if this bed-shear alone were used, the side prongs 30, Figure 6, would be bent down. We therefore sustain these prongs by the rocking supports $i\ i$, that are formed of steel bars, kept towards the sides of the bed-shear $h$ by the spring 6.

In order to move these supports away at their upper edges from the shear $h$, to give a slight opening for the cutters $e$ to enter, and prevent their coming upon the edge of $i$, we make use of the projecting inclines 7, acted upon by the cutters $e\ e$ at that end.

It will be evident that the cutters $e$, when used upon a blank piece of metal, as seen in Figure 5, will slit the same, and leave a centre prong, 31; and the two side prongs will be turned off some little distance horizontally, as seen in fig. 6.

In order to guide the plate while being cut, we provide a notch or guide at 8, for the tang of the fork to rest in, or a guide may be provided at the side of the shear.

The cutters $e$ are wider apart near the stock $d'$ than at the cutting-edge, to give opportunity for the prong to be drawn out from between the shears as soon as cut.

It will be evident that this shear may be employed to cut only one incision, as seen in Figure 9, where the metal is shown as slitted, at 40, to form two tines for a four-pronged fork.

The next operation is to open or turn the prongs out, in order that they may be in a form where they can be drawn down or forged to shape. This we effect by means of a bending-plunger or plungers, having a winding surface, in combination with a swinging support.

The dies $k$, $l$, and $m$ are formed with winding surfaces at 10, the lower end of each plunger being narrow, to enter the slit of the metal, cut as aforesaid, and the winding surface of the plunger acts to turn back the prong or prongs, and open the slit. The plungers, however, could not be employed with such winding surfaces, were it not for swinging supports that sustain the prongs while being bent back.

The supports 12 12 swing at one end upon the pintles 13, and the other ends rest in segmental recesses in the surface of the bed-block.

The fork is laid upon $f$, with its tang in the notch 14, and as the plungers come down, they bend back the prongs into the form shown in Figure 7, the swinging supports 12 moving upon their pintles, while the winding surfaces of the plungers bend the metal.

These swinging supports are returned to their place by the spring 15 and pushing-slide 16, or by any other suitable means.

The single plunger $m$ operates to bend the prongs of a two or more tined fork into the position shown in Figure 10, the swinging support 17 sustaining one prong while being bent around nearly at right angles, the tang lying between the lugs 18 19. If a four or more tined fork is being made, the other end is heated and slitted, and then presented to the plunger $m$, for it to open the slit and bend back the prong, as before described.

The plunger $m$ is formed with a wedge-shaped projection, at 20, on one side, that turns the prong 32 back slightly, as seen in fig. 10, the same being bent against the lug 21, in order that there may be room for the dies to act subsequently in drawing down the prongs.

The swinging support 17 is sustained at the moving end upon the surface of $f$, and at the other end is a ledge, as seen in larger size in fig. 4, and it is retained in place by a pin, 33, receiving a half-cylindrical fulcrum, 34, projecting below the support, so that the point of support and motion may be, as nearly as possible, upon the straight edge of the plunger, from which straight edge the winding-surface may be described as produced by a line having the straight edge of the plunger as its axis, and moving along said plunger as it revolves.

The spring 35 returns the support 17 to its place when the plunger rises.

It will be evident that the swinging supports 12 17 might be employed in connection with a wedge-shaped bending-die, if desired.

This machine is adapted to the manufacture of any kind of fork, hook, or rake, and we remark that the shoulders of the fork, hook, or rake may be pressed to form, if desired, previously to the forging or drawing down of the tines, for which purpose such a machine as that patented to J. C. Bachelor, March 20, 1866, may be employed.

The reciprocating dies or hammers employed to forge or draw down the tines are of the usual character.

We have shown one machine as fitted to perform all the successive operations, but it will be evident that the shears might be separated from the bending-mechanism, and that this bending-mechanism might be made in separate machines, if desired, or the dies provided for the separate operations.

The swinging supports 12 17 might be made so as to rest upon their lower end or edge, and swing out vertically as the bending progresses, instead of swinging horizontally, as shown, thereby sustaining the prong, as aforesaid.

What we claim, and desire to secure by Letters Patent, is—

1. The cutters $e\ e$, formed wider apart near the stock than at the cutting-edge, in combination with the shear $h$, for the purposes and as set forth.

2. The rocking support $i$, in combination with the cutter $e$ and bed-shear $h$, for the purposes and substantially as set forth.

3. The swinging supports 12, in combination with the winding, wedge-shaped, bending-plunger $m$, arranged and operating substantially as and for the purposes set forth.

4. The connecting-rod $b$ and ball 1, in combination with the screw 3, head 4, and hollow plunger $c$, carrying the cutting or bending-tools, substantially as set forth.

In witness whereof, we have hereunto set our signatures this 20th day of May, 1868.

<div style="text-align:right">HEMAN WHIPPLE,<br>ELON DENIO.</div>

Witnesses:
  H. P. SULLIVAN,
  SETH DUNBAR.